UNITED STATES PATENT OFFICE.

LEON LILIENFELD, OF VIENNA, AUSTRIA.

PROCESS OF MANUFACTURE OF DIALKYLSULPHATES.

1,427,215.  Specification of Letters Patent.  Patented Aug. 29, 1922.

No Drawing.  Application filed January 10, 1921. Serial No. 436,381.

*To all whom it may concern:*

Be it known that I, Dr. LEON LILIENFELD, of Podhajce, Poland, a citizen of Poland, residing at 1 Zeltgasse, Vienna, VIII, Austria, have invented certain new and useful Improvements in a Process of Manufacture of Dialkylsulphates (for which I have made application in Austria Dec. 15, 1913, and Germany Nov. 14, 1920), of which the following is a specification.

In so far as they are not confined to the isolation of the dialkyl-sulfate (diethyl-sulfate) formed directly by mixing alcohol with sulfuric andydrid in the cold, all processes which have been hitherto proposed for the manufacture of dialkylsulphates from alcohols and sulphuric andydride are based on the principle of converting alkyl sulphuric acid into alkylsulphate with the simultaneous splitting off of sulphuric acid.

This principle may be expressed by the equation:—

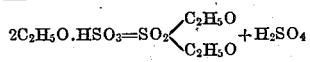

The previous processes require therefore for one molecule of alcohol, one molecule of sulphur trioxide, and they produce unsatisfactory yields of dialkyl-sulfate, because the free sulfuric acid continually forming in such processes, decomposes a part of the dialkyl-sulfate.

I have now found that it is possible to obtain alkylsulphates from two molecules of alcohol and one molecule of sulphuric anhydride without splitting off free sulfuric acid, but probably with the splitting off of one molecule of water according to the following equation:—

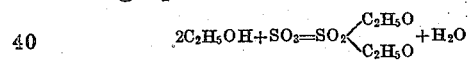

It is possible also to consider the above reaction as involving the intermediate production of alkylsulphuric acid, that is to say, from one molecule of alcohol and one molecule of $SO_3$ alkyl-sulphuric acid is formed as an intermediate product and the latter reacts on another molecule of alcohol in order to produce an alkylsulphate, according to the following equations:—

1st phase:

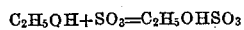

2nd phase:

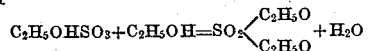

The working conditions consists in this, that the reaction is effected in the presence of dehydrating agents such as anhydrous sodium sulfate and anhydrous copper sulfate, phosphorus pentoxid, and the like, which materials are hereinafter embraced in the expression substance which is active as a dehydrating agent in such mixture, but which will not cause the decomposition of dialkyl sulfate, and optionally diluents are employed in treating the alcohol with sulphur trioxide. The present process gives excellent yields, because no free sulfuric acid is formed during the reaction.

The process is carried out in such a manner that the alcohol is caused to react with the sulphur trioxide as such or in the form of fuming sulfuric acid, while in the presence of dehydrating agents of the character above specified and in the absence or presence of suitable diluents and that the reaction mixture is subjected after the reaction has been completed either to vacuum distillation or, after previous heating in a vacuum or in the presence of air, the reaction mixture is diluted with cold water and the alkylsulphate formed is extracted by means of a suitable solvent, such as chloroform, carbon tetrachloride or the like.

The dehydrating agent, for example, phosphorus pentoxide, anhydrous sodium sulphate, anhydrous copper sulphate, may be mixed with the alcohol either before or after the sulphur trioxide has been added. It may alternately be added in two portions, one being added before and the other being added after the addition of the sulphuric anhydride has been effected.

The following examples are given, for the purpose of illustration, it being understood that the invention is not restricted to these examples:

*Example 1.*—To 92 parts by weight of absolute ethyl alcohol, diluted with 400 parts by weight of carbon tetrachloride, 48 parts by weight of phosphorus pentoxide were added while cooling the mixture with ice. Then, into the ice-cooled mixture while stirring, sulphur trioxide is distilled or led, 58 parts by weight of sulphur trioxide being absorbed. Then a further 26 parts by weight of phosphorus pentoxide were added to the reaction mixture and the carbon tetrachloride and the excess of alcohol were distilled off and the residue was subjected to vacuum distillation, 88 parts by weight of ethyl sulphate being obtained. The ethyl sulphate was pure and colorless. It was subjected to the usual washing with a highly diluted soda-solution and extraction with chloroform. The chloroform extract on evaporation yielded 85 parts by weight of chemically pure colorless ethylsulphate, which corresponds to a yield of 75.2% of the theoretical.

*Example 2.*—The mode of operation differed from that in the example 1 only in that the cooling was effected by means of a freezing mixture, and that no tetrachloride of carbon or other diluting agent was used. The yield was 62% of the theoretical. By reducing the quantity of phosphorus pentoxide used in the example, yields of ethylsulphate were obtained which may be still regarded as good.

*Example 3.*—92 parts by weight of absolute ethyl alcohol were mixed with 400 parts by weight of carbon tetrachloride and into the well-cooled mixture sulphur trioxide was introduced while cooling. The increase of weight due to sulphur trioxide was 80 parts by weight. 100 parts by weight of anhydrous sodium sulphate were then added to the reaction mixture and the tetrachloride of carbon was distilled off. The residue gave by vacuum distillation 80 parts of ethylsulphate which yielded 77 parts of ethylsulphate after the usual extraction by means of chloroform. This corresponds to an efficiency of 50%.

The technical advance represented by the process according to the invention as compared with the previous processes consists in the following: (1) the above-mentioned process is simple and short; (2) it requires no excess of sulphur trioxide; (3) it requires relatively cheap and simple apparatus and little labour; (4) it allows of carrying out the distillation under a comparatively moderate vacuum (such as a vacuum of 25 to 30 mm.), while the processes hitherto known require a high vacuum.

What I claim and desire to secure by Letters Patent is:—

1. A process of producing dialkyl sulfate by means of sulfuric anhydrid which comprises causing sulfuric anhydrid to act upon aliphatic alcohols in the presence of a substance which is active as a dehydrating agent in such mixture, but which will not cause the decomposition of dialkyl sulphate.

2. A process of producing diethyl sulfate by means of sulfuric anhydrid which comprises causing sulfuric anhydrid to act upon ethyl alcohol while in the presence of a substance which is active as a dehydrating agent in such mixture, but which will not cause the decomposition of diethyl sulphate.

3. In the process of claim 1, the step of conducting the operation in the presence of a diluent which is inert toward such reaction mixture and the products of such reaction.

4. A process of producing dialkyl sulfate, which comprises treating an aliphatic alcohol, with sulphuric anhydrid adding a substance which is active as a dehydrating agent in such mixture, but which will not cause the decomposition of dialkyl sulfate, and distilling the mixture under vacuum.

5. A process of producing di-ethyl sulphate, which comprises first treating ethyl alcohol with sulphuric anhydride, secondly adding anhydrous sodium sulphate and distilling the mixture under vacuum.

In testimony whereof I have signed my name to this specification in the presence of two subscribing witnesses.

Dr. LEON LILIENFELD.

Witnesses:
 HERMANN WUNDERLICH,
 FRANZ SCHIAMKY.